United States Patent Office 3,526,101
Patented Sept. 1, 1970

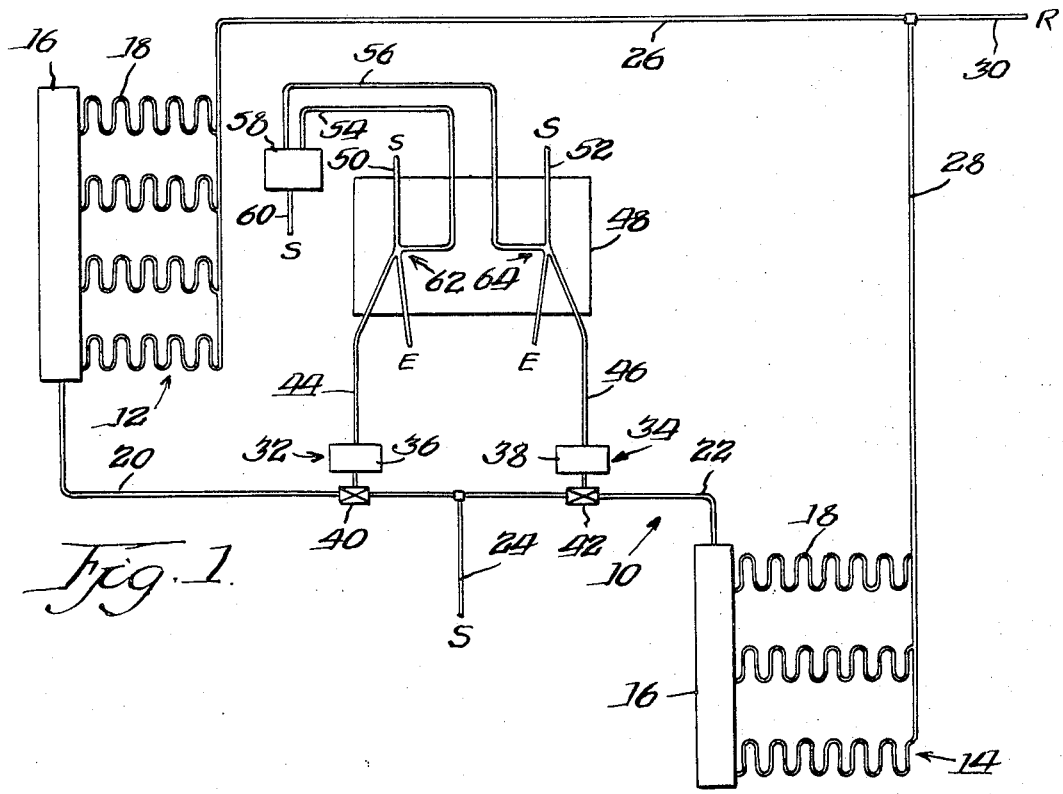

3,526,101
FLUIDIC COOLING CONTROL
David H. Thorburn, Oak Park, Ill., assignor, by mesne assignments, to Powers Regulator Company, Skokie, Ill., a corporation of Delaware
Filed Aug. 5, 1968, Ser. No. 750,217
Int. Cl. F25b 41/04
U.S. Cl. 62—223                                9 Claims

ABSTRACT OF THE DISCLOSURE

A cooling system including a pair of cooling or refrigeration units which are selectively controlled by fluidic relays in accordance with sensed environmental temperature. The first cooling unit is adapted to operate only when the sensed temperature is greater than a predetermined reference value, while the second cooling unit operates only when the temperature is equal to or less than the reference value but greater than a predetermined minimum value. To accomplish this selectivity, a pair of monostable fluidic relays are adapted to open and close valves which control the flow of coolant to the cooling units. The relays exhaust in a stable condition, but operate in the presence of control signals to provide a fluid signal to open the valves. The control signals are selectively transmitted to the relays by means of a switch which is actuated by a temperature responsive transducer. Whenever the temperature in the vicinity of the transducer is greater than the reference value, a control signal is transmitted to the first relay, thus causing the first valve to open, allowing operation of the first cooling unit. As the temperature sensed by the transducer falls below the reference value, the switch disconnects the control signal from the first relay and connects a similar control signal to the second relay, thus causing the second cooling unit to operate. When the temperature sensed by the transducer reaches the minimum value the switch acts to remove the control signal from the second relay and neither cooling unit operates.

BACKGROUND—SUMMARY—DRAWINGS

This invention relates to cooling systems, and more particularly, to fluidic control of cooling systems in refrigerator cars or trucks. Although the invention will be described in the context of a cooling system for a refrigerated vehicle, it should be understood that the invention is equally suited to any environment in which it is desired to maintain a minimum temperature value below which the environment may not be cooled.

Cooling control systems for refrigerated vehicles have in the past taken a variety of forms, both mechanical and electrical. These prior systems, however, have been characterized by a high degree of complexity and thus relatively high cost, or, on the other hand, by a low degree of reliability. Reliability is a particularly important factor, inasmuch as such systems are subjected to unusual stresses because of the fact that they are employed in moving environments. In addition, most such systems have failed to provide for satisfactory fail-safe limitations with respect to the minimum tolerable temperature within the environment. This is significant where, for example, the vehicle is used to transport perishable foodstuffs which would be severely damaged by freezing.

It has now been found that, with the use of fluidic control elements and noval switching means, the temperature within a refrigerated vehicle may be satisfactorily regulated with positive limitation upon the minimum tolerable temperature. A system to accomplish these goals may be constructed at low cost with an absolute minimum of moving parts, and is extremely resistant to the stresses caused by movement of the vehicle. Such a system, constructed in accordance with the present invention, includes a pair of cooling units, preferably employing a fluid coolant. The first of the cooling units may be located, for example, near the top of the vehicle's refrigeration chamber, while the second cooling unit is located at the bottom. The flow of coolant to the cooling units is controlled by means of valves which are responsive to fluid signals provided by a fluidic control unit. The fluidic control unit, in turn, is responsive to fluid control signals provided by a temperature responsive means which includes a temperature responsive transducer. When the temperature in the vicinity of the transducer exceeds a predetermined reference value, the temperature responsive means causes a first control signal to be transmitted to the fluidic control unit. The control unit, in turn, transmits a fluid signal which opens the first valve, thus causing the first cooling unit to operate. If the temperature of the vicinity of the transducer falls below the reference value, the temperature responsive means removes the first control signal from the fluidic control unit and transmits a similar second control signal thereto. This second control signal results in the transmission of a second fluid signal to the second valve, thus causing the second cooling unit to operate. However, should the temperature near the transducer fall below a preselected minimum value, no control signal is transmitted to the fluidic control unit and neither unit operates. Thus, the first cooling unit operates only when the temperature near the transducer is above the reference value, and the second cooling unit operates only when the temperature is in the range between the reference value and the minimum value.

In order to accomplish this positive temperature control, the fluidic control unit preferably includes a pair of monostable fluidic relays which are adapted to exhaust in the stable mode. However, when a control signal is present at the control port of one of the relays, its power stream is transmitted to the valve with which it is respectively associated. The temperature responsive means includes a pair of conduits for transmitting the control signals to the monostable relays. Also included is a movable element associated with the temperature responsive transducer for mechanical displacement thereby. The movable element is adapted to selectively connect and disconnect each of the control conduits with a source of control fluid. In accordance with the invention, when the movable element is displaced in a direction dictated by a decreasing temperature in the vicinity of the transducer, the second control conduit becomes connected with the control fluid supply as the first control conduit is disconnected therefrom; further movement in that direction causes disconnection of the second control conduit as well, so that neither cooling unit operates. Displacement of the movable element in the opposite direction, however, is limited, so that the first control conduit is always connected with the control fluid supply at temperatures exceeding the reference value.

These and other advantages and structural features of the invention will be more fully understood by considering the remainder of the specification and the claims, with illustrative reference to the drawing, in which:

FIG. 1 is a schematic representation of a cooling system in accordance with the present invention; and FIG. 2 is a more detailed schematic representation of a portion of the system of FIG. 1.

DETAILED DESCRIPTION OF EXEMPLARY EMBODIMENT

With reference to FIG. 1, there is shown a cooling system, generally denoted by the numeral 10, constructed in accordance with the present invention. This illustrated cooling system includes a pair of cooling units 12 and 14 which are used to remove heat from a desired environment, as for example a refrigerated vehicle or the like. Each of the cooling units 12 and 14 includes a manifold 16 and a set of cooling coils 18. The cooling units 12 and 14 may be of any suitable type; however, in the preferred form of the invention, the units are of the type which employ a fluid coolant or heat-exchanging substance (e.g., nitrogen). To this end, the cooling units 12 and 14 are respectively connected to conduits 20 and 22, which communicate with a common coolant supply line 24. In like manner, the coils 18 of the cooling units 12 and 14 respectively termintate in return conduits 26 and 28, which communicate with a common coolant return line 30. Suitable pumping apparatus (not shown) may be provided in association with the lines 24 and 30.

Associated respectively with the coolant conduits 20 and 22 are operating means generally denoted by the numerals 32 and 34. Each of the operating units 32 and 34 respectively includes actuating means 36 and 38 and valves 40 and 42. The valves 40 and 42 respectively control the flow of coolant in the conduits 20 and 22 to the cooling units 12 and 14. The actuating units 36 and 38, which may be of any suitable fluid-operated type, are respectively connected to signal conduits 44 and 46 and are responsive to the presence of fluid signals in those conduits to open the valves 40 and 42. Thus, for example, when a fluid signal is present in the conduit 44, the actuating means 36 responds to open the valve 40, thereby permitting a flow of coolant from the supply line 24 through the conduit 20 and into the cooling unit 12. When no fluid signal is present in the conduit 44, the valve 40 remains closed.

The fluid signal conduits 44 and 46 communicate with a fluidic control unit 48. Also communicating with the control unit 48 are a pair of fluid signal supply lines 50 and 52, and a pair of fluid control signal conduits 54 and 56. The latter conduits also communicate with a temperature responsive means 58 which is connected to a fluid control signal supply line 60. As will be hereinafter described in greater detail in connection with FIG. 2, the fluidic control unit 48 includes a pair of fluidic amplifiers or relays 62 and 64, which are preferably of the monostable type. The temperature responsive means 58 include a temperature responsive transducer 66, preferably an adjustable bellows-type thermostat.

As indicated previously, the cooling units 12 and 14 are selectively operated by the operating units 32 and 34, the fluidic control unit 48 and the temperature responsive means 58 in accordance with the sensed temperature in the vicinity of the transducer 66. More specifically, these various control elements are adapted to operate the first cooling unit 12 only when the temperature in the vicinity of the transducer 66 is greater than a predetermined reference value X. As the temperature in the vicinity of the transducer 66 decreases, the cooling unit 12 ceases to operate while, at the same time, the cooling unit 14 becomes operative. The cooling unit 14, then, operates only when the temperature sensed by the transducer 66 is in the range between X (the reference value) and X—A or Y (a predetermined minimum value). When the temperature sensed by the transducer 66 has the value Y or less, neither of the cooling units 12 and 14 operates. Thus, the cooling unit 12 operates at all temperatures in excess of X, and the cooling unit 14 operates over the range of A degrees between X and Y, while at Y or below, neither unit operates. This system provides for a small temperature differential A during which the cooling unit 14 (which may have less capacity than the unit 12) serves to smooth temperature fluctuations within the regulated environment.

Turning now to FIG. 2, there is shown in more detail a portion of the system 10, including the operating means 32 and 34, the fluidic control unit 48, and the temperature responsive means 58. As illustrated, each of the monostable fluidic relays 62 and 64 includes, in addition to the fluid signal conduits 44 and 46, the fluid signal supply conduits 50 and 52 and the fluid control signal conduits 54 and 56, exhaust conduits 68 and 70, respectively. The relays 62 and 64 respectively consist essentially of fluid supply ports 50a and 52a, control ports 54a and 56a, signal ports 44a and 46a and exhaust ports 68a and 70a, all of which communicate with their correspondingly numbered conduits.

Considering, for example, the operation of the monostable relay 62, a stream of signal fluid enters the relay through the conduit 50 and emerges from the supply port 50a. Because of the alignment of the exhaust port 68a, such a stream would normally enter the exhaust port and be exhausted from the relay 62 through the exhaust conduit 68. However, if a fluid control signal or stream of control fluid appears in the control conduit 54, so as to exit through the control port 54a, the fluid signal stream emerging from the supply port 50a is deflected from the exhaust port 68a to the signal port 44a, where it continues through the signal conduit 44 to affect the actuating unit 36 and open the valve 40. When the control signal disappears from the conduit 54, the signal fluid stream is again free to exhaust through the conduit 68, and the valve 40 returns to its closed condition. The monostable amplifier or relay 64 operates in a similar manner, to open and close the valve 42 in response to the presence or absence of a control signal in the conduit 56.

The free ends of the control signal conduits 54 and 56 are associated, in the temperature responsive means 58, with a movable switch element 72 consisting essentially of a flat strip of metal or other rigid material. The switch element 72, which has a pair of apertures 74 and 76, is linked to the transducer 66 for mechanical displacement thereby. Thus, for example, as the temperature in the vicinity of the transducer 66 decreases, the switch element 72 is displaced to the left as shown in the drawing.

Also associated with the movable switch element 72 in the temperature responsive means 58 are a pair of conduits 78 and 80, both of which are connected to the control signal fluid supply line 60. As can be seen, the conduits 78 and 80 are substantially aligned respectively with the free ends of the control signal conduits 54 and 56.

When the switch element 72 is in the position shown in FIG. 2, it may be assumed that the temperature in the vicinity of the transducer 66 is greater than the predetermined reference value X. Indeed, the displacement of the switch element 72 may be suitably limited so that, for all transducer temperatures in excess of X, the element will not be moved any further to the right than shown in the drawing. Under such conditions, the aperture 74 in the element 72 is aligned with both the conduit 78 and the free end of the control signal conduit 54. Thus, a control signal is present in the conduit 54 and the valve 40 remains open. However, as the temperature sensed by the transducer falls below the reference value X, the transducer causes leftward displacement of the switch element 72. Thus, the position of the apertures 74 and 76 relative to the conduits 54, 56, 78 and 80 is altered. In this manner, as the switch element 72 moves to the left, the strength of the control signal in the conduit 54 begins to decrease, and that in the control signal conduit 56 begins to increase, until the aperture 76 is in substantial alignment with both the conduit 56 and the conduit 80. At this point, the control signal in the conduit 56 will have caused the relay 64 to switch the fluid signal from the exhaust conduit 70 to the signal conduit 46, thus opening the valve 42. Further movement of the switch element 72 to the left, in response to an additional decrease of temperature in the vicinity of the transducer 66, will ultimately move the aperture 76 out of alignment with the conduits 56 and 80, thus closing the valve 42.

As can be seen from the foregoing, the reference temperature value X can be selected by suitable adjustment of the transducer 66, while the temperature differential A (and thus the minimum value Y), over which the cooling unit 14 operates, can be selected by varying the spacing of the apertures 74 and 76 in the switch element 72. It should be apparent that, in accordance with this novel switching arrangement, the switch element 72 need not be provided with seals and, indeed, is not required to act in the manner of a valve. Inasmuch as the apertures 74 and 76 merely permit or obstruct the flow of control fluid, the switch element 72 may float freely in the space between the free ends of the conduits 54 and 56 and the conduits 78 and 80. Moveover, where a relatively harmless coolant such as nitrogen is employed in the cooling units 12 and 14, this same coolant may be used as the signal and control fluids.

Thus, the present invention provides a cooling system control which is extremely reliable and rugged, with a minimum of moving parts, and which achieves a smooth temperature control. In addition, because of the fluidic relay elements, the system is fail-safe with respect to any predetermined minimum temperature.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

What is claimed is:

1. A system for regulating the temperature in an environment, comprising: first and second cooling units; first and second valves for respectively controlling a flow of coolant to said cooling units; first and second actuating means for respectively opening said valves in response respectively to first and second fluid signals; first and second fluidic relays for providing said fluid signals respectively in response to first and second fluid control signals; and temperature responsive means for providing said fluid control signals, said first fluid control signal being provided only when the temperature in said environment is essentially greater than a preselected reference value, and said second fluid control signal being provided only when said temperature is essentially equal to or less than said reference value but essentially greater than a preselected minimum value.

2. A cooling system comprising: a temperature responsive transducer; first and second cooling units; first and second operating means respectively adapted to operate said cooling units respectively in response to first and second fluid signals; first and second fluidic relays respectively responsive to first and second fluid control signals for providing said fluid signals to said operating means; and switch means responsively associated with said transducer for providing said first fluid control signal to said first relay only when the temperature in the vicinity of said relay is essentially greater than a predetermined reference value, and for providing said second fluid control signal to said second relay only when the temperature in the vicinity of said transducer is essentially equal to or less than said reference value but essentially greater than a predetermined minimum value.

3. A cooling system in accordance with claim 2, wherein said fluidic relays are monostable fluidic elements each adapted to exhaust its power stream in the stable mode and to transmit its power stream to its respectively associated operating means in the unstable mode.

4. A cooling system in accordance with claim 2, wherein each of said operating means includes a valve controlling a flow of coolant to its respectively associated cooling unit, and a valve actuating means responsive to its respectively associated fluid signal to open said valve.

5. A cooling system in accordance with claim 2, wherein said cooling units employ a fluid coolant, and wherein a portion of said coolant is employed to provide said fluid signals and said fluid control signals.

6. A cooling system in accordance with claim 2, including first and second control conduits adapted to transmit said first and second fluid control signals respectively to said first and second relays from a supply of control fluid selectively in response to the operation of said switch means.

7. A cooling system in accordance with claim 6, wherein said switch means includes a movable element connected to said transducer for mechanical displacement thereby and adapted to selectively connect and disconnect said control conduits with said control fluid supply.

8. A cooling system in accordance with claim 7, wherein displacement of said movable element in a direction dictated by a decreasing temperature in the vicinity of said transducer causes said second control conduit to become connected with said control fluid supply as said first control conduit is disconnected therefrom.

9. A cooling system in accordance with claim 8, wherein displacement of said movable element in the opposite direction is limited, so that said first control conduit is always connected with said control fluid supply at temperatures essentially greater than said reference value.

References Cited
UNITED STATES PATENTS
2,576,663    11/1951    Atchison _____ 62—199

MEYER PERLIN, Primary Examiner

U.S. Cl. X.R.
62—199; 137—81.5